(12) United States Patent
Cote

(10) Patent No.: US 12,129,822 B1
(45) Date of Patent: *Oct. 29, 2024

(54) AUTONOMOUS UNDERWATER BEACON LOCATOR

(71) Applicant: AJC Innovations, LLC, Auburn, NH (US)

(72) Inventor: Almond J. Cote, Auburn, NH (US)

(73) Assignee: AJC Innovations, LLC, Auburn, NH (US)

( * ) Notice: Subject to any disclaimer, the term of this patent is extended or adjusted under 35 U.S.C. 154(b) by 20 days.

This patent is subject to a terminal disclaimer.

(21) Appl. No.: 17/977,056

(22) Filed: Oct. 31, 2022

Related U.S. Application Data

(63) Continuation of application No. 16/995,384, filed on Aug. 17, 2020, now Pat. No. 11,486,346, which is a continuation of application No. 16/105,799, filed on Aug. 20, 2018, now Pat. No. 10,746,154, which is a continuation of application No. 15/219,167, filed on Jul. 25, 2016, now Pat. No. 10,054,104.

(Continued)

(51) Int. Cl.
| | |
|---|---|
| *F03B 13/20* | (2006.01) |
| *B63G 8/00* | (2006.01) |
| *B64D 45/00* | (2006.01) |
| *G01V 1/00* | (2024.01) |
| *G05D 1/00* | (2024.01) |
| *H02K 7/14* | (2006.01) |
| *G05D 1/10* | (2006.01) |

(52) U.S. Cl.
CPC .............. *F03B 13/20* (2013.01); *B64D 45/00* (2013.01); *G01V 1/001* (2013.01); *G05D 1/0088* (2013.01); *G05D 1/10* (2013.01); *H02K 7/14* (2013.01); *B63B 2209/14* (2013.01); *B63G 2008/004* (2013.01); *B64D 2045/0065* (2013.01); *F05B 2240/931* (2013.01); *F05B 2260/4031* (2013.01); *F05B 2260/42* (2013.01); *F05B 2260/5032* (2013.01); *Y02E 10/30* (2013.01)

(58) Field of Classification Search
CPC . F03B 13/20; B64D 45/00; B64D 2045/0065; G01V 1/001; G05D 1/0088; G05D 1/10; H02K 7/14; B63B 2209/14; B63G 2008/004; F05B 2240/931; F05B 2260/4031; F05B 2260/42; F05B 2260/5032; Y02E 10/30
See application file for complete search history.

(56) References Cited

U.S. PATENT DOCUMENTS

| | | |
|---|---|---|
| 3,204,110 A | 8/1965 | Masuda |
| 4,352,023 A | 9/1982 | Sachs |

(Continued)

FOREIGN PATENT DOCUMENTS

WO     2012032251 A1     3/2012

OTHER PUBLICATIONS

Kongsberg, "Autonomous Underwater Vehicle—Seaglider", Retrieved on: Apr. 26, 2015, Published in: Norway.

(Continued)

*Primary Examiner* — Anthony D Wiest
(74) *Attorney, Agent, or Firm* — Loginov & Associates, PLLC; William A. Loginov

(57) ABSTRACT

The present disclosure provides a small, inexpensive, long-lived underwater beacon locator. The beacon locator can illustratively include a housing, a communications link, a processor, a plurality of hydrophones and a motion generator.

13 Claims, 4 Drawing Sheets

Related U.S. Application Data

(60) Provisional application No. 62/196,888, filed on Jul. 24, 2015.

(56) References Cited

U.S. PATENT DOCUMENTS

| | | | |
|---|---|---|---|
| 4,438,343 | A | 3/1984 | Marken |
| 4,438,843 | A | 3/1984 | Graser |
| 4,951,263 | A | 8/1990 | Shope |
| H1560 | H | 7/1996 | Gill |
| 5,570,324 | A | 10/1996 | Geil |
| 5,631,101 | A | 5/1997 | Amero |
| 5,894,450 | A | 4/1999 | Schmidt |
| 6,645,665 | B2 | 11/2003 | Aw |
| 7,046,027 | B2 | 5/2006 | Buchanan |
| 7,184,363 | B2 | 2/2007 | Szegedi |
| D539,216 | S | 3/2007 | Hamaguchi |
| 7,243,734 | B2 | 7/2007 | Wu |
| D562,226 | S | 2/2008 | Uehlein-Proctor |
| D623,589 | S | 9/2010 | Tarter |
| 8,247,105 | B2 | 8/2012 | Liu |
| 8,677,920 | B1 | 3/2014 | Jeng |
| 9,563,203 | B2 | 2/2017 | Davoodi |
| 9,718,523 | B2 | 8/2017 | Tan |
| 2004/0065247 | A1 | 4/2004 | Horton |
| 2005/0169104 | A1 | 8/2005 | Szegedi |
| 2009/0127856 | A1 | 5/2009 | Hench |
| 2010/0042324 | A1 | 2/2010 | Murphy |
| 2010/0302901 | A1 | 12/2010 | Welker |
| 2013/0083624 | A1 | 4/2013 | Brizard |
| 2015/0107239 | A1 | 4/2015 | Beane |
| 2017/0067436 | A1 | 3/2017 | Li |

OTHER PUBLICATIONS

Teledyne Marine Systems, "Slocum G2 Glider—Situational Awareness From an Ultra-Efficient Underwater Vehicle", Retrieved on Jul. 15, 2015, Published in: USA.

University of California, San Diego, "Underwater Gliders", Retrieved on Jun. 28, 2010, Publisher: SCRIPPS Institute of Oceanography, Published in: USA.

AUTONOMOUS UNDERWATER BEACON LOCATOR

RELATED APPLICATIONS

The present application is a continuation of co-pending U.S. patent application Ser. No. 16/995,384, entitled AUTONOMOUS UNDERWATER BEACON LOCATOR, filed Aug. 17, 2020, which is a continuation of co-pending U.S. patent application Ser. No. 16/105,799, entitled AUTONOMOUS UNDERWATER BEACON LOCATOR, filed Aug. 20, 2018, now U.S. Pat. No. 10,746,154, issued Aug. 18, 2018, which is a continuation of co-pending U.S. patent application Ser. No. 15/219,167, AUTONOMOUS UNDERWATER BEACON LOCATOR, filed Jul. 25, 2016, now U.S. Pat. No. 10,054,104, issued Aug. 21, 2018, which claims the benefit of U.S. Provisional Application Ser. No. 62/196,888, filed Jul. 24, 2016, entitled AUTONOMOUS UNDERWATER BEACON LOCATOR, the entire disclosure of each of which applications is incorporated by reference.

FIELD OF THE INVENTION

This invention is in the field of autonomous devices, and more particularly, devices which search for and locate objects under water.

BACKGROUND OF THE INVENTION

The aircraft flight data recorder (FDR) is a device that preserves the recent history of an aircraftflight through the recording of dozens of parameters collected several times per second. The aircraft cockpit voice recorder (CVR) preserves the recent history of the sounds in the cockpit including the conversation of the pilots. The two recorders give an accurate testimony narrating the aircraft's flight history to assist in any later investigation. Modern FDRs are typically protected from crash damage by a double wrap of strong corrosion-resistant stainless steel, or titanium, on the exterior and high-temperature insulation inside for protection against fire. An underwater locator beacon transmitter (i.e., pinger) is mounted on a bracket bolted to the front of an FDR, designed to emit an ultrasonic "ping" for up to 30 days and enable operation while immersed to a depth of up to 6,000 meters (20,000 ft.). Together, these recorders are known as "black boxes".

The sea is a difficult search environment and technology limitations are problematic. Black boxes are often hard to locate when an aircraft goes down over water and much more difficult to locate when the aircraft goes down over deep water. Existing search methods involve manual efforts that can be dangerous, costly, time consuming, and highly dependent on good weather conditions. If the crash site is not found immediately, water currents can disperse crash debris over hundreds of miles. The ultrasonic pinger (i.e., Underwater Locator Beacon, "ULB") in the FDR has a finite battery life (30 days) and limited detection range (1 to 2 kilometers under normal conditions). Crash sites in deeper water make locating the black boxes even more difficult because of high pressures and the presence of inversion layers (i.e., layers of different water temperatures and salinity that create acoustic boundaries). These layers of deep alternating water densities can reflect and scatter the pinger sound obscuring it. Such effects can combine to give a false location or make the pinger completely undetectable and prevent the ULB from being found. Further, ocean noise competes with the ULB and can mask the pings or create false ping detections.

Oceans cover about 71% of the Earth's surface, 90% of which is considered deep ocean (i.e., more than 200 meters deep). The deepest part of the ocean called the Abyssopelagic Zone (or Abyssal Zone) is over 4,000 meters deep and occupies 83% of the oceans' total area (about 300 million square kilometers). Each of the oceans has its own average depth, from the relatively shallow Arctic Ocean at 1,200 meters to the Pacific Ocean at 4,638 meters. Deep trenches are found in all oceans and the Marianas Trench is believed to be the deepest at 11,021 meters.

The ULB is detectable under normal conditions over a range of 1-2 km, and under good conditions up to 4-5 km. It is activated by immersion in water. The frequency of the pings is 37.5 KHz (±1 kHz) with an acoustic output of 160.5 db. The pulse rate is 0.9 pings per second. The power source is a lithium battery.

Existing beacon locator technology in use today is boat towed, manually deployed, and requires the use of: a towed detector, tow cables, winches, hydraulic power units, generators, and an operator at a control console on the tow boat to monitor the system for detections. Such systems have limited capabilities and coverage and can only be safely and effectively used under good weather conditions.

Some representative aircraft ocean crashes include TWA Flight 800 in 1996. The black boxes were found in 8 days, at a depth of 37 meters. The black boxes for Egypt Air 990 in 1999 were found after 10 days at a depth of 60 to 83 meters. The black boxes for Air France Flight 447 were found in May 2011 at a depth of 2,987 meters after a search of about 700 days, long after the pinger battery expired. Malaysia Air Flight 370 is still an ongoing search, at depths of about 3,900 meters. It would be desirable to have a device that could search autonomously within a search grid and that: does not require a towing vessel, is surface and air deployable, is able to search at all ocean depths under all sea and weather conditions, requires no human participation on site, and is capable of regularly sending search reports from anywhere in the world to a stationary, or mobile, search coordinating facility anywhere in the world.

SUMMARY OF THE INVENTION

This invention overcomes disadvantages of towed beacon locators by providing a small, autonomous, long-lived beacon locator that is inexpensive to operate and use under all weather conditions. This makes the simultaneous use of multiple beacon locators easily affordable thereby maximizing search area coverage in minimal time and at minimal cost. The beacon locator allows for greater ease of recovery in a deep water environment.

One aspect of the disclosure provides a beacon locator, comprising: a housing; a communications link; a processor; a plurality of hydrophones; and a motion generator stored within the housing, the motion generator comprising: at least one pendulum configured to move in response to ocean movement, a first gear at least indirectly engaged with the at least one pendulum that rotates in response to the pendulum movement, a second gear directly engaged with the first gear that rotates in response to rotation of the first gear, and a generator that converts rotation of the second gear into an electrical current.

In one example, the at least one pendulum comprises two pendulums connected via a main shaft that engages with the first gear.

In one example, the two pendulums are connected to the main shaft via respective pendulum shafts.

In one example, the beacon locator further includes a drive shaft that connects the second gear to the generator.

In one example, the first gear and the second gear are housed in a gear box that rotates freely about the drive shaft such that the second gear rotates in response to gear box rotation.

In one example, the motion generator comprises a stowed position within the beacon locator and a deployed position allowing the at least one pendulum to move in response to ocean movement.

In one example, the plurality of hydrophones are distributed on a lower surface of the housing.

In one example, the plurality of hydrophones comprises: a first hydrophone disposed at a port position of the beacon locator, a second hydrophone disposed at a starboard position of the beacon locator, and a third hydrophone disposed at a bow position of the beacon locator.

In one example, the locator beacon further includes a camera disposed on a lower surface of the housing.

In one example, the locator beacon further includes a battery configured to be charged at least indirectly by the generator.

Another aspect of the disclosure provides a motion generator comprising: at least one pendulum configured to move in response to ocean movement, a first gear at least indirectly engaged with the at least one pendulum that rotates in response to the pendulum movement, a second gear directly engaged with the first gear that rotates in response to rotation of the first gear, and a generator that converts rotation of the second gear into an electrical current.

In one example, the at least one pendulum comprises two pendulums connected via a main shaft that engages with the first gear.

In one example, the two pendulums are connected to the main shaft via respective pendulum shafts.

In one example, the locator beacon further includes a drive shaft that connects the second gear to the generator.

In one example, the first gear and the second gear are housed in a gear box that rotates freely about the drive shaft such that the second gear rotates in response to gear box rotation.

Another aspect of the disclosure provides a motion generator, comprising: at least one pendulum configured to move in response to ocean movement, a generator that converts rotation of the at least one pendulum into an electrical current.

In one example, the at least one pendulum comprises two pendulums connected via a main shaft that engages directly with the generator.

BRIEF DESCRIPTION OF THE DRAWINGS

The invention description below refers to the accompanying drawings, of which.

DETAILED DESCRIPTION

The present disclosure provides an autonomous underwater glider that is small in size, has low power consumption, and has a long battery life. The locator can cover a large search area autonomously (e.g., without user input) and can operate in deep water under all weather conditions to execute a search for a black box and wreckage. The locator can travel at 0.5 to 1 kts and can cover up to 10 $kts^2$/hr.

Figure 1:
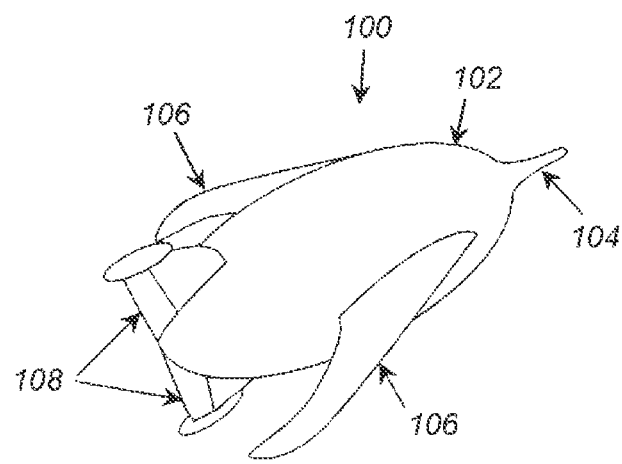
FIG. 1 is a perspective view of an exemplary beacon locator according to one or more aspects of the disclosure.

FIG. 1 is a perspective view of an exemplary beacon locator according to one or more aspects of the disclosure. As shown, the locator 100 has an external housing 102. The housing 102 is depicted as substantially ovoid or football-shaped, but can be any low drag hydrodynamic shape in any number of examples. The housing comprises an aluminum alloy designed to withstand 1,000 atmospheres of pressure thereby allowing the locator to descend to significant depths in the ocean. The locator 100 can include a communications antenna 104 positioned on the locator 100 such that itis out of the water while surfaced, thereby allowing for a communication link. The locator 100 can include one or more fins 106 that can be positioned at opposite sides of the housing 102. The fins 106 can be composite, aluminum alloy, or titanium. As shown, the fins 106 have a curved profile in the aft direction of the locator 100 but could be otherwise swept back or straight in any number of examples. The fins 106 can assist in vertical underwater navigation by providing a hydrofoil coupled with changes in beacon locator buoyancy to generate forward gliding motion. The fins 106 can be fixed in place or can be movable. In the example where the fins are movable, the fins can be actuated in any direction, can be tilted, or rotated to control the locator glide pitch angle and velocity. The locator 100 can also include a rudder 108 having upper and lower components on the top and bottom of the locator 100 that can assist in horizontal navigation and roll. In one example, the rudder can be an aluminum alloy or titanium. All metal surfaces exposed to water can be treated to protect them from corrosion. The locator can be any size or shape, and in one example can have a length from stern to bow of approximately 1 to 3 ft. The locator can have any mass, provided the mass is less than an overall mass of the water volume displaced by the locator to allow for vertical buoyant movement underwater.

Figure 2:
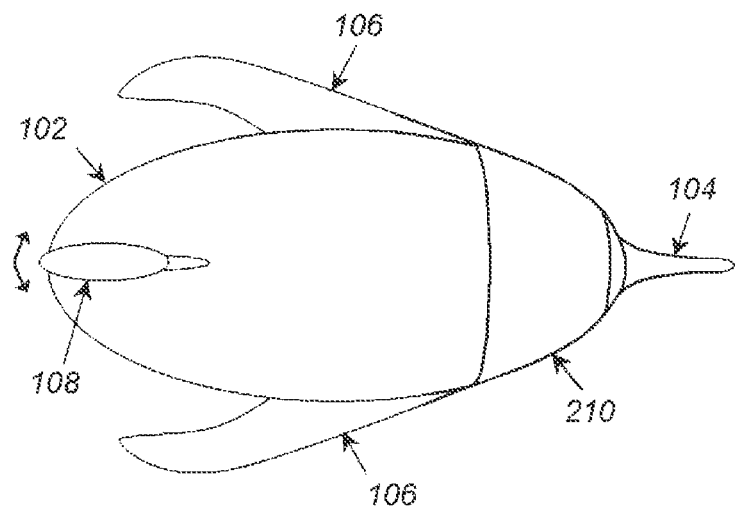
FIG. 2 is a top view of an exemplary beacon locator according to one or more aspects of the disclosure.

FIG. 2 is a top view of an exemplary beacon locator according to one or more aspects of the disclosure. As shown, the fins 106 and rudder 108 are visible from a top view. As also shown, the rudder 108 is capable of rotation to allow for horizontal navigation of the locator. The locator can include a solar panel 210 and a communications antenna 104. The solar panel 210 can collect solar energy and convert it to electrical power for use by the locator. The antenna 104 can be for any kind of link capable of wireless communication, such as a radio or satellite link, GPS, WiFi, Bluetooth, NFC, etc. Such communication link can allow for communication with a remote computing device, such as a computer server (having a processor and a memory) positioned somewhere on land or a server positioned on a boat at sea. In other examples, the locator can communicate directly with end users by sending text messages, pinger detection reports and photos directly to personal computers and smart mobile phones so that such users can monitor the status and progress of locator searches from anywhere in the world.

In conjunction with the antenna 104, the locator can include a GPS receiver that receives GPS information to allow for location of the locator to be identified while on the ocean surface.

Figure 3:
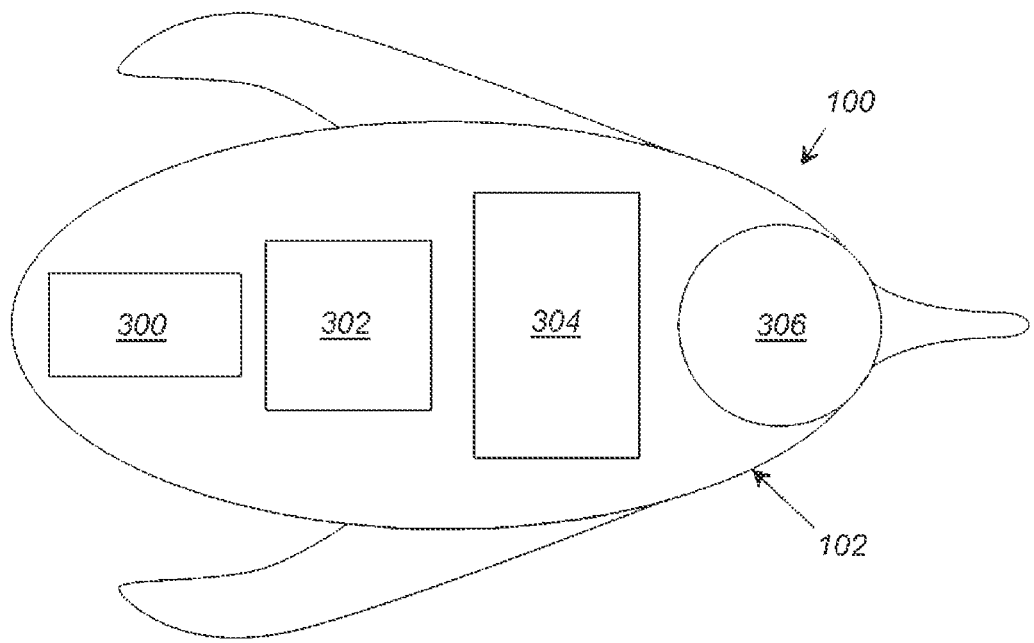
FIG. 3 is a schematic diagram of an exemplary beacon locator according to one or more aspects of the disclosure.
Figure 4:
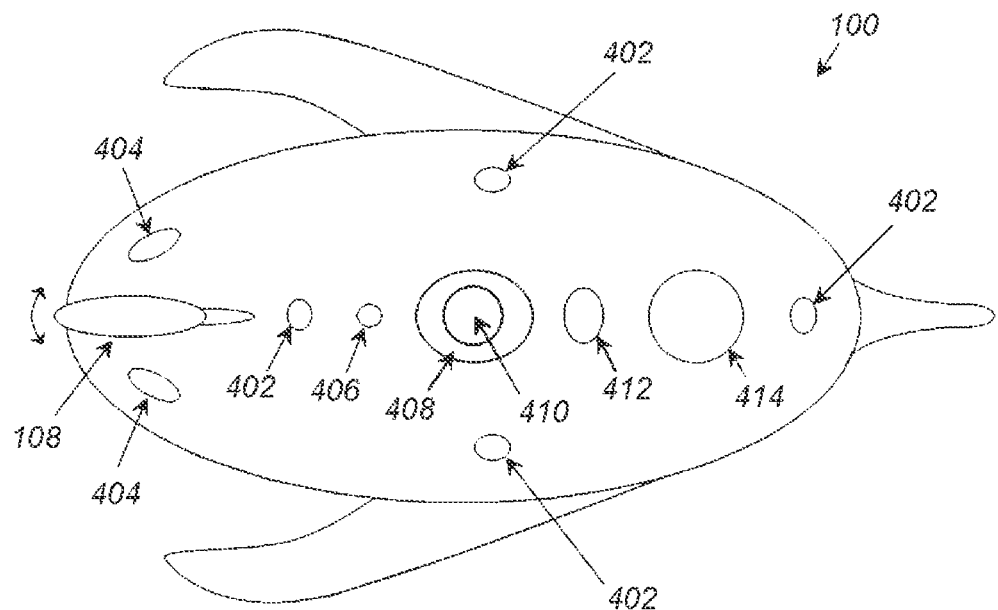
FIG. 4 is a bottom view of an exemplary beacon locator according to one or more aspects of the disclosure.

FIG. 3 is a schematic diagram of an exemplary beacon locator according to one or more aspects of the disclosure. In this example, the locator 100 can include a control surface actuator 300 for controlling the rudder 108 and fins 106. For example, the actuator can control the rotation of the rudder 108 or fins 106 in response to one or more commands from the processor 510/514 (described below). The locator can also include one or more electronic components 302, such as a processor, memory, an attitude sensor, a nine degree of freedom (9-DOF) inertial measurement unit (IMU) comprising: 3-axis angular rate sensors, 3-axis linear translation accelerometers, and 3-axis magnetometer (i.e., compass). The IMU output can be used to help maintain the locator track and establish its position under water in the absence of GPS. The locator can include an integrated inertial navigation system (INS) that independently performs these functions. The processor can be one or more processors or controllers that can execute instructions stored in the memory. The memory can be a non-transitory (e.g., a non-volatile memory) storage medium that can store the instructions discussed above for execution by one or more processors and can also store data. Such data can include, for example, any data collected or generated by any of the sensors or components onboard the locator, such as locator track history, candidate pinger detections including digital sound recordings with associated detection reports, digital photographs of the sea floor, etc., and predetermined search patterns to be executed, or any other type of data capable of being stored on a non-transitory storage medium. The attitude sensor can assist in determining glide slope and roll angle to help set velocity, and/or direction. The locator can also include power components 304, such as an internal rechargeable Lithium Ion battery and/or super capacitor and/or a motion generator. The locator can also include pump/ballast components 306, such as a pump and a ballast tank. Ballast tanks can be installed in one or more positions on the locator. The pump can pump water into or out of the ballast tank to control beacon locator buoyancy in the water. For example, if the locator is to descend to the bottom of the ocean from the surface, the pump would pump water into the ballast tank to decrease the buoyancy of the locator or, to conserve power, the ballast tank can be flooded by opening water ballast ports and allowing water to flow in under its own pressure. Once the locator has taken on sufficient water ballast it has negative buoyancy. This downward force will partially translate into a horizontal force by way of the fins, which are arranged so as to provide a resulting horizontal force component, thereby propelling the locator horizontally while descending. Similarly, if the locator is to ascend to the surface, water is removed (pumped out) from the ballast tank to increase the vertical buoyant force. That force is translated into a horizontal force by way of the fins, thereby propelling the locator horizontally as it ascends.

Figure 5:
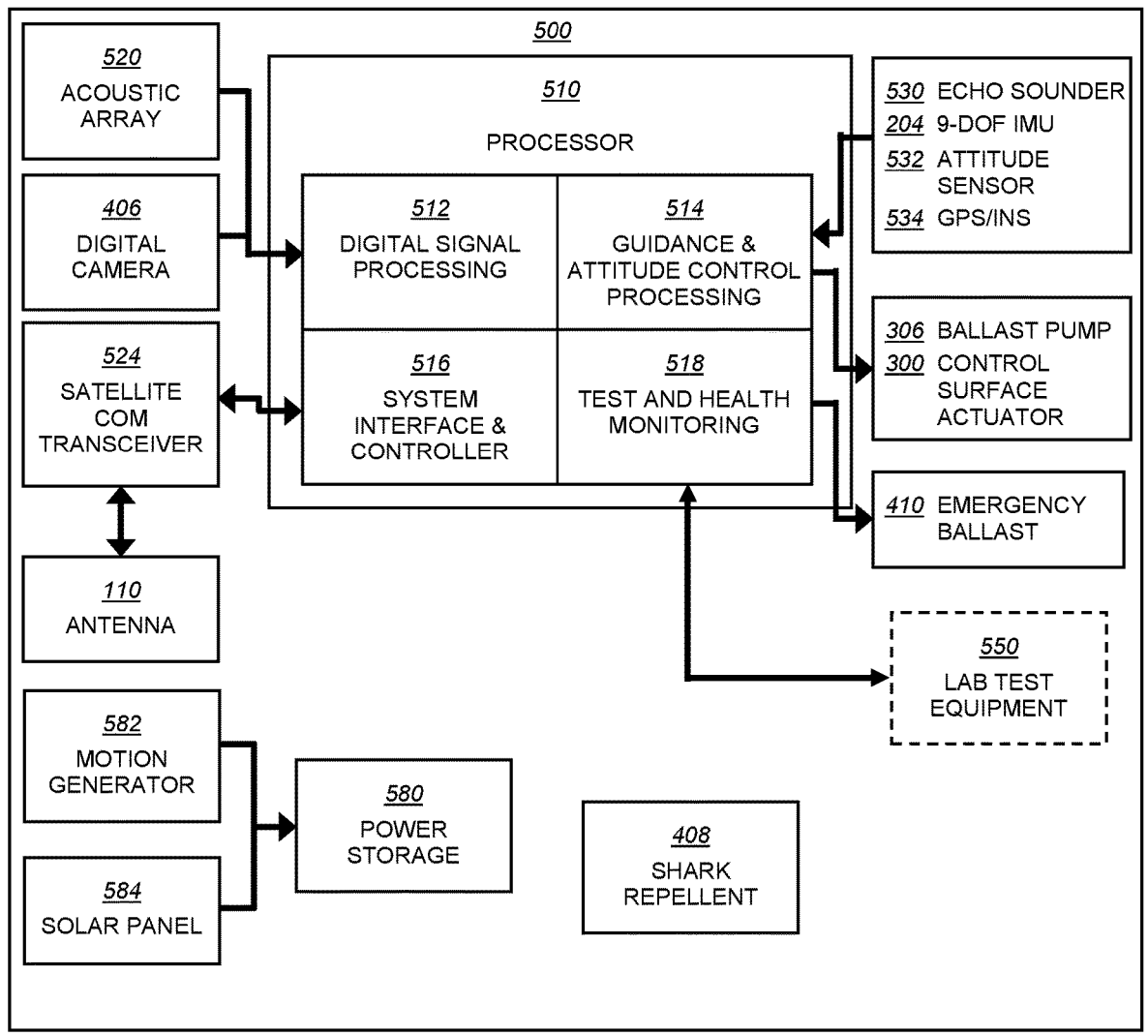
FIG. 5 is a system diagram of an exemplary beacon locator according to one or more aspects of the disclosure.

FIG. 5 is a bottom view of an exemplary beacon locator according to one or more aspects of the disclosure. The locator 100 can include one or more hydrophones 402. In one example, the hydrophones can be placed at port, starboard, bottom, and bow locations of the locator 100. The hydrophones can sense acoustic signals from an underwater beacon. The arrangement of hydrophones in this example allows for beacon signal direction to be identified. For example, a comparison of the relative phase of the signals received at each of the respective hydrophones can provide the necessary information to indicate a direction from which the signal originated. The camera 406 can be any type of camera, such as a CCD or CMOS camera, and can have several and separate optical/imager components or can be a self-contained optical system. The locator can also include a shark repellant material 408, such as samarium, that, in this example, is located at an undersurface of the locator. The locator can also include an emergency ballast 410, a camera flash 412, an echo sounder 414, and a water ballast port 404. The emergency ballast 410 can be used if a pump or other beacon locator component malfunctions, at which point the locator may perform an uncontrolled ascent to the surface. For example, if the system undergoes a significant malfunction, rendering the ballast pump inoperable, ejecting the emergency ballast will increase the buoyancy and cause the locator to rise to the surface. Without such a system, it is conceivable that the locator itself could be lost along with all of its data collected since its last communication.

The water ballast port 404 can serve as an entry/exit for water into/out of the ballast tank as well as water pressure inlet for a depth sensor which can be included in the locator. The depth sensor can provide accurate depth information that can be used to adjust the depth of the locator in the ocean by way of the pump/ballast system. The camera 406, and associated flash 412, can be used to take photographs of scenes underwater. Such photographs may be taken on a regular basis or may be taken in response to a detected feature in the water, such as wreckage or beacon location. If the black-box pinger battery life has expired, and the box remains lost, the search can be continued by switching the locator to a search mode where a photographic survey of the ocean bottom is conducted over an area defined by remote operators, either before the search, or while the locator is on the surface collecting GPS position data and sending search reports via the remote communications link (e.g., via satellite). The locator can process acquired images in real time to detect potential targets of interest and provide detection reports. Detection reports can include: latitude, longitude, depth, and images of potential wreckage. The echo sounder 414 can be used to accurately measure the distance to the ocean floor or for submerged object collision avoidance.

FIG. 5 is a system diagram 500 of an exemplary beacon locator according to one or more aspects of the disclosure. The processor 510 can execute any number of processes or sub-processes in order to control operation of the locator 100. For example, the processor can include a digital signal processing (DSP) module 512 that interfaces with the acoustic array 520 (comprising one or more hydrophones). The DSP 512 can receive audio data from the acoustic array and can process such audio data to determine if a beacon has been detected, for example, by comparing a received audio signal to the known pinger acoustic signature and generating a confidence score based thereon. Further, the DSP 512 can receive image data from the digital camera to determine if there are any detectable features within images, such as wreckage debris. Such detection can occur, for example, by comparison of feature contrast ratios and edge detections, or by any other method of feature detection.

The system interface and controller 516 can send and receive information (e.g., to/from a remote server, to/from a remote user, etc.) by way of satellite com transceiver 524. Such information can include, for example, commands or requests from a remote server or search and locator status updates sent from the locator to the remote server. The system controller 516 receives such commands or requests and provides such requests to the appropriate sub-process of the processor 510. The system controller 516 can collect data from all other functions, sub-processes, and/or components, can provide memory storage, and can prepare reports to be sent over the communication link. The system controller 516 also processes search command updates received over the communication link and submits them to the guidance and attitude control processor 514. The system controller 516 can also request more in-depth diagnostic testing from test and health monitoring 518 in response to a real-time request from the remote user or as part of the health monitoring protocol.

The guidance and attitude control processing 514 controls overall movement and performs location determination of the locator 100. For example, processing 514 can receive data from any of the onboard components of the locator such as depth sensor, echo sounder, compass, attitude sensor, accelerometers, etc. to determine or estimate current position (e.g., latitude/longitude), heading, depth, pitch/roll angle, velocity, etc. Such estimates can be made and stored in the onboard memory at a regular interval while underwater until the locator surfaces, at which point the estimated latitude/longitude can be compared to the actual position as obtained from the GPS satellite receiver. The locator can then update its internal estimates and store the updated position information in the onboard memory. Further, the locator can estimate water current velocity and use these data as a factor when estimating position, heading, and depth information while underwater and out of harmonization with the GPS.

The guidance and attitude control processing 514 can also receive and store an updated search path during the search, by way of satellite com transceiver 524, or can have such a predetermined pattern programmed prior to deployment. In this regard the guidance and attitude control processing 514, having the estimated position/heading/velocity information, can control one or more of: the ballast pump, fins, and rudder actuator in order to follow the prescribed search pattern. The guidance and attitude control processing can detect unusual or violent locator motion (possible evidence of interference from a biologic or other moving object) and, along with health monitoring 518, can cause emergency ballast 410 ejection if necessary.

The test and health monitoring 518 can monitor the overall operability of the locator 100. For example, it can monitor any of the systems or subsystems mentioned above, or below, and provide reports to the system interface and controller 516 for relay to a remote server via the communications link. Prior to deployment, the overall health of the locator can be tested by way of a wired interface, or short range wireless link, to one or more lab test equipment 550 devices. In some examples, the monitoring 518 may provide status updates regarding system failure while the locator has surfaced during a search operation. In still other examples, detection of system failure by monitoring 518 can trigger the emergency ballast causing the locator to perform an uncontrolled ascent to the surface.

In operation, the locator may start out of the water. At this point the beacon may be programmed with one or more of the following parameters: search pattern and depth, and search update reporting frequency. In one example, the search patterns may be a set of waypoints at defined latitude, longitude, and depth limits that allows the locator to vary locator depth between the ocean floor, or some predetermined level above the ocean floor and the surface over a particular area. Any desired search pattern can be programmed for the locator to execute.

While at the surface, either initially or after having performed a dive during a search operation, the locator can provide status information to a remote server. Such information can include, for example: signals detected by hydrophone, any captured images, battery strength, historical locator track and sensor data, and data regarding the overall health and operation of the locator itself from monitoring 518. The frequency at which the locator provides such updates can also be programmed at the start (prior to deployment) or can be adjusted during a search via remote link when the locator surfaces.

Prior to deployment, the hardware and software of the locator can be checked by interfacing (wired or wirelessly) with lab or field test equipment 550. Such equipment can engage in a thorough battery of tests to ensure the health and operability of all system functional elements prior to deployment.

Once deployed and the search has begun, the locator can develop (and store on the onboard memory) a search status report and can provide this report to a remote server periodically or at variable intervals while surfaced. Such search status report can include any of the data or information described above, e.g., signals detected by hydrophone, any captured images, battery strength, historical track, location, heading, velocity, depth data from one or more sensors on the locator, processed detection and image data and data regarding the health and operation of the locator itself from built-in-test (BIT) and health monitoring 518.

As mentioned, during the search the locator may glide to the surface obtain its GPS position and file a search status report with the remote server by satellite. At that point, the locator may also receive updated search patterns or commands from the remote server and may loiter on the surface to charge batteries by way of a motion generator 582 or solar panel 584. While at the surface, the locator may charge its internal battery via a motion generator (discussed in greater detail below) or using solar cells mounted on the nose of the locator. In some examples, the search may continue only when the battery has reached a predetermined charge state so as to ensure adequate power for subsequent dive(s).

As the search is resumed, the search will continue until the wreckage is detected with a preset confidence value. The confidence value may be determined in part by output signals from hydrophones or imagery from the camera, or a combination of both. The received acoustic signal can be compared to a known pinger acoustic signature in real time to determine detection confidence level. Once confidence in the detected signal is established, the locator can "home in" on the pinger by autonomously adjusting its track, continuously updating and improving pinger location estimates using the latest hydrophone array data, and making necessary track corrections until the location of the acoustic signal source is found. Further, the camera image processing may detect potential wreckage and identify various elements, with some confidence, by comparing the color, size, and shape to known physical attributes for those items. In another example, the locator may disperse an echo sounder signal into the surrounding ocean to help identify and locate wreckage.

After the beacon is located, the locator will glide to the surface and identify its current GPS coordinates (e.g., lat./long.) via satellite link. Once acquired, the updated beacon location will be sent to a remote server, along with a status report and a signal indicative of the beacon having been detected. As mentioned, an audio file of the pinger or an image of the wreckage, or both, may accompany this for remote verification. Once reported, the locator will remain on the surface while continuously charging its battery (via motion generator or solar panel, or both) and periodically reporting its GPS location via satellite until it receives a new command via satellite link (e.g., request to perform a photo survey of the wreckage site), or until the locator is recovered.

Figure 6:
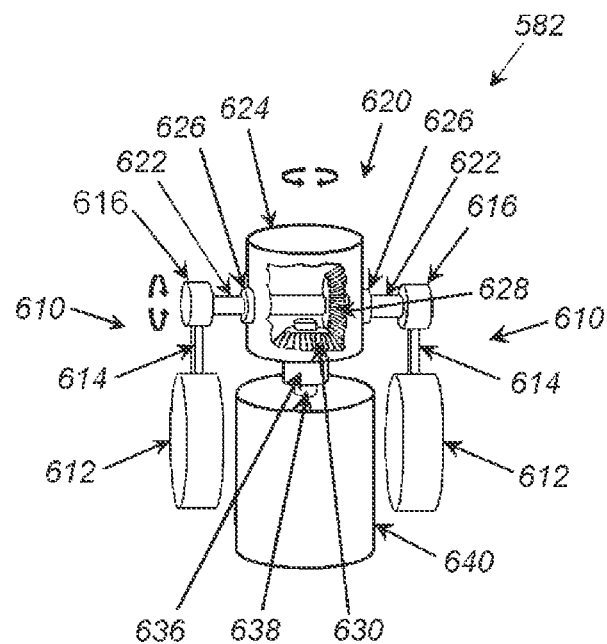
FIG. 6 is a diagram of an exemplary motion generator according to one or more aspects of the disclosure.

FIG. 6 is an example motion generator according to one or more aspects of the disclosure. As shown, the motion generator 582 can include a pendulum arm assembly 610, which assembly includes a pendulum weight 612, a pendulum shaft 614, a pendulum support 616, and a main shaft 622. The pendulum assembly 610 engages with a free rotating gear box 620 via bearings 626 and via first gear 628. While in motion in the ocean, the pendulums may rotate about the shaft 622, causing rotation of the first gear 628. Such rotation in turn causes rotation of the second gear 630 and ultimately rotation of generator drive shaft 638. The shaft 638 is connected to a generator 640 (e.g., a dynamo, alternator, or any other type of electromechanical device capable of converting mechanical rotation into electrical energy) that can convert the rotational energy into an electrical current to charge the onboard rechargeable battery or super capacitor. The generator 640 can be mounted such that its shaft is properly aligned with the locator to ensure maximum conversion of average locator motion to electrical energy. For example, the motion generator 582 can be mounted inside the locator housing 102 with the top of the gearbox 620 facing the nose (i.e., antenna 104) and the axis of the generator shaft 638 parallel to, and coincident with, a line extending through the center of the locator housing 102 from the tail to the tip of the nose. To protect the motion generator 582 from damage from high g impacts, during handling or deployment, the motion generator 582 can be held in a stowed position mechanically securing the pendulum and gearbox before use. Once deployed, the motion generator 582 can be released from the stowed position allowing the pendulum and gearbox to move freely.

Figure 7A:
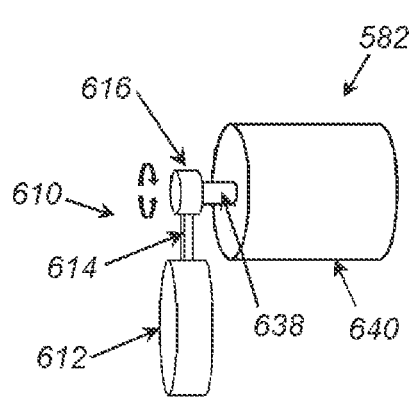
FIGS. 7A-B are diagrams of additional examples of a motion generator according to one or more aspects of the disclosure.
Figure 7B:
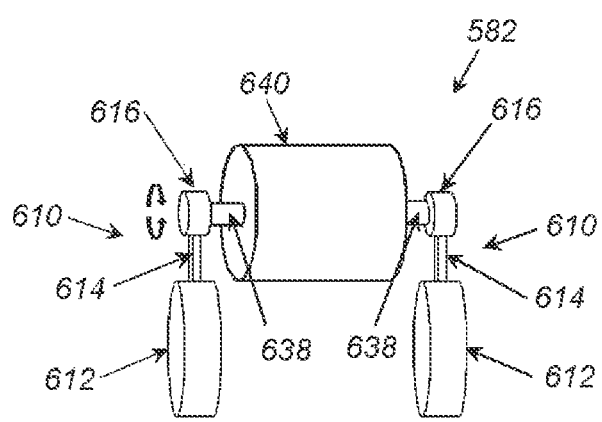

The gearbox 620, itself, can rotate about shaft 638, independent from rotation of the pendulums 612. This gearbox rotation can similarly translate into rotation of second gear 630 and ultimately result in current generation from generator 640 thereby providing the ability to generate power from two axes of rotation. In general, any locator motion causing pendulum rotation (i.e., swing) or gearbox rotation can result in rotation of both the gearbox and pendulum through 2-axis coupling by the gears. In other embodiments shown in FIG. 7, one or more pendulums 612 can be attached directly to the generator shaft 638 without the use of a gearbox affording only a single axis of rotation. In this embodiment, nonzero angular rate of the pendulum 612 (FIG. 7A) or pendulums 612 (FIG. 7B) about the generator drive shaft 638 causes the shaft to rotate producing electrical energy.

Advantageously, the motion generator 582 can be driven by platform rotation in the presence of surface waves causing gearbox rotation and pendulum motion, or the locator 100 can be made to execute a continuous roll while ascending at 45 degrees, or other non-zero angle from vertical, from its last dive, causing gearbox rotation to drive the generator shaft 638. Power generation by the motion generator, while on the surface, will be greatest while the locator is subjected to quasi chaotic motion such as the sudden rotation, tumbling, and linear differential acceleration (i.e. linear jerking) that might be experienced during heavy seas. The motion generator can convert locator differential acceleration (i.e., jerk or jerking) motion into electrical energy provided there is a significant component of the differential acceleration vector (i.e., jerk vector) perpendicular to the plane described by the axis of the pendulum shaft 614 and the axis of the shaft that the pendulum 610 is mounted on (either FIG. 6 or 7) causing pendulum swing. For the case of the 2-axis configuration (FIG. 6) exclusively, a significant component of the differential acceleration vector (i.e., jerk vector) to the main shaft 622 while the pendulums are rotated such that their shafts 614 are not parallel to the generator shaft 638 can cause gearbox rotation resulting in power generation. Such conditions could exist during rough seas. The weights and moment arms can be tuned to optimize performance on the sea, where the average water wave frequency and amplitude information is known. The generator can be surrounded by a magnetic shield to avoid interface with other components on board the locator, such as the compass. The generator can be locked in a neutral position while submerged to avoid uncontrolled influence on locator attitude while searching. The movement of shaft 638 can generate a random frequency AC waveform which can then be converted into a pulsating DC using a full wave rectifier onboard the generator or positioned elsewhere in power generation circuitry on board. The rectified output of the generator charges a holding capacitor which feeds charging circuitry for the battery or super capacitor which are a part of power storage 580.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. For example, as used herein the terms "process" and/or "processor" and/or "processing" and/or "control" and/or "controller" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

What is claimed is:

1. An autonomous underwater beacon locator, comprising:
   a housing that is hydrodynamically optimized for deep-water operations under varying water pressures;
   a communications link system including an antenna for surface and satellite communications;
   an onboard processor system comprising sub-processors and memory capable of processing sensor data, receiving and executing remote commands, generating and communicating reports, executing stored navigational and operational instructions, and monitoring and controlling locator function;

a plurality of hydrophones;

a power system comprising a motion-responsive generator, a solar panel and an onboard rechargeable energy storage unit;

a navigation system enabled by movable fins and a rudder; and a suite of sensors enabling detection, location, and identification of targets of interest, and performing collision avoidance, wherein the motion-responsive generator converts locator rotation and wave-induced differential linear acceleration into electrical energy based on an orientation of a first vector component of the differential linear acceleration relative to an axis of a generator shaft of a generator pendulum and an axis of a main shaft to which the generator pendulum is mounted, the first vector component causing the generator pendulum to swing.

2. The autonomous underwater beacon locator of claim 1, wherein the housing is composed of a material selected from a group consisting of aluminum alloys, titanium, and composites, each configured to resist corrosion and withstand high-pressure environments up to and including 1000 atmospheres.

3. The autonomous underwater beacon locator of claim 1, wherein the motion-responsive generator is aligned within the housing such that the axis of at least one of the generator shaft or the main shaft is substantially parallel to and coincident with a line extending centrally through the housing from a tail of the housing to a tip of a nose of the housing.

4. The autonomous underwater beacon locator of claim 1, wherein the motion-responsive generator is configured to convert rotational energy into electrical energy while the locator is subjected to quasi-chaotic motion during heavy seas.

5. The autonomous underwater beacon locator of claim 1, wherein the navigation system further includes an integrated inertial navigation system (INS) utilizing a multi-axis inertial measurement unit (IMU) to facilitate underwater tracking and positioning absent external location signals.

6. The autonomous underwater beacon locator of claim 1, wherein the suite of sensors comprises an echo sounder used to accurately measure ocean floor distance or for submerged object collision avoidance, the plurality of hydrophones for target detection and location, and a camera for creating images of targets of interest.

7. The autonomous underwater beacon locator of claim 6, wherein camera imagery is combined with acoustic data to detect potential wreckage and identify various elements by comparing imaged object color, size, and shape combined with acoustic waveform detections to known physical and acoustic waveform features of a target of interest.

8. The autonomous underwater beacon locator of claim 1, wherein the onboard processor system controls a mode of operation of the locator, alternating between beacon detection mode of operation and search mode of operation wherein a photographic survey of an ocean bottom area defined by remote operators is conducted.

9. The autonomous underwater beacon locator of claim 1, further including environmental adaptation features including a corrosion-resistant coating on all external metal surfaces, an emergency ballast system for rapid ascent in case of system failure, and a shark repellent material located on the housing.

10. The autonomous underwater beacon locator of claim 1, further including an acoustic array system capable of detecting and triangulating signals from underwater beacons or receiving echo sounder signals dispersed by the locator to help identify and locate wreckage, and integrate such data with camera imagery to locate objects of interest.

11. The autonomous underwater beacon locator for claim 1, wherein the motion-responsive generator employ weights and moment arms that are tuned to optimize performance based on average water wave frequency and amplitude.

12. A system for underwater exploration and data collection, comprising:

an autonomous underwater beacon locator including:

a hydrodynamically optimized housing capable of deepwater operations under varying water pressures;

a communications link system including an antenna for surface and satellite communications;

an onboard processor system comprising sub-processors and memory capable of processing sensor data, receiving and executing remote commands, generating and communicating reports, executing stored navigational and operational instructions, and monitoring and controlling locator function;

a plurality of hydrophones;

a power system comprising a motion-responsive generator, a solar panel and an onboard rechargeable energy storage unit, wherein the motion-responsive generator converts locator rotation and wave-induced differential linear acceleration into electrical energy based on an orientation of a first vector component of the differential linear acceleration relative to an axis of a generator shaft of a generator pendulum and an axis of a main shaft to which the generator pendulum is mounted, the first vector component causing the generator pendulum to swing;

a navigation system enabled by movable fins and a rudder; and a suite of sensors enabling detection, location, and identification of targets of interest, and performing collision avoidance;

a remote server configured to receive data from and send commands to the locator; and a user interface accessible from remote locations allowing users to monitor and control operations of the locator.

13. The system of claim 12, wherein the user interface enables users to define search patterns, receive real-time updates including visual and acoustic data, and adjust operational parameters of the locator based on observed conditions and collected data.

* * * * *